Jan. 28, 1969   O. BUUS   3,424,838
METHOD OF MANUFACTURING A CONSTRICTION-TYPE PIPETTE
Filed Dec. 1, 1964
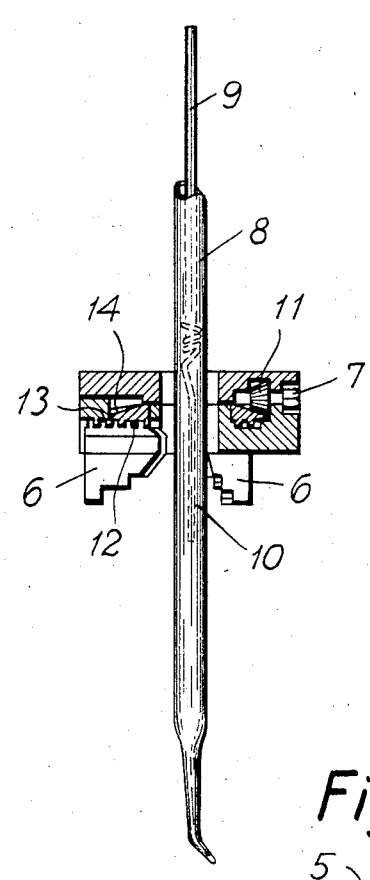
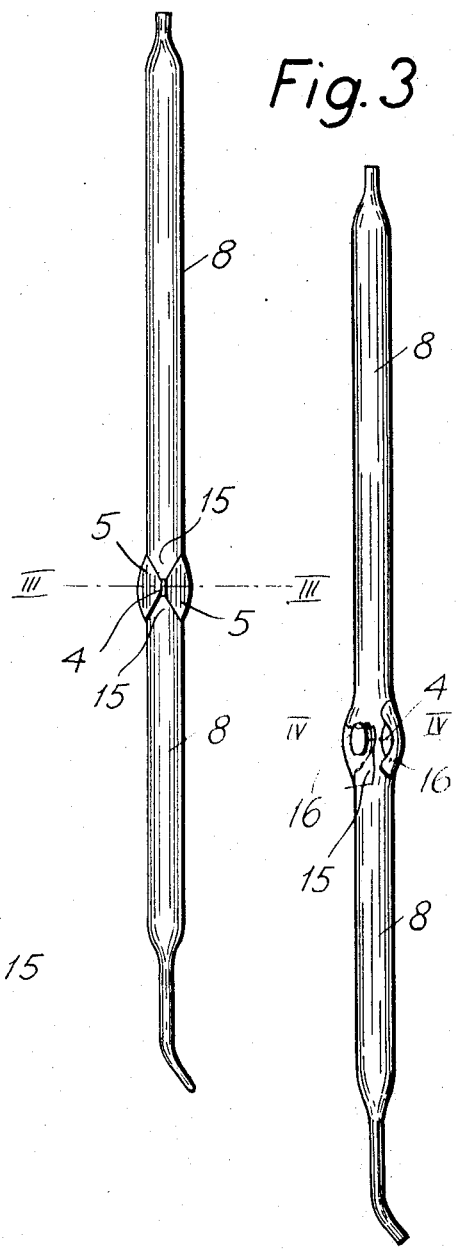
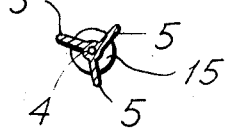
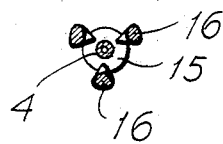

United States Patent Office 3,424,838
Patented Jan. 28, 1969

3,424,838
METHOD OF MANUFACTURING A CONSTRICTION-TYPE PIPETTE
Ole Buus, Brandts Vaenge 12, Birkerod, Denmark
Filed Dec. 1, 1964, Ser. No. 414,992
Claims priority, application Denmark, Dec. 6, 1963,
5,692/63
U.S. Cl. 264—320                                6 Claims
Int. Cl. B29d 23/00

ABSTRACT OF THE DISCLOSURE

Method of manufacturing a constriction-type pipette in a single constructing operation in which a translucent plastic tube is deformed along an axial region or section by simultaneously applying heat externally to the axial region and inwardly applied pressure at circumferentially spaced areas in the axial region and causing plastic to flow outwardly from the tube to form radial ribs extending axially along the axial region. The tube is internally supported by a wire in the axial region which defines the internal dimension of the constriction and removes heat from internally of the axial region. The ribs strengthen the constricted region so that it has the same strength as the other axial regions or portions of the tube since plastic is neither added or removed from the constricted region.

---

This invention relates to a method of manufacturing constriction-type pipettes of translucent plastic, in which hot deforming means are passed towards the pipette tube which is thereby deformed to produce the constriction.

Constriction-type pipettes of glass have been manufactured for a long time and in these cases the constriction is produced by melting the glass. It is not possible, however, to obtain a well defined constriction with this material, which on the whole is not very durable for pipettes due to its brittleness.

Such pipettes have therefore been made of plastic, such as polyethylene, the constriction is produced by flattening the plastic tube by means of a pair of tongs with jaws having pressure surfaces provided with notches sufficiently large to prevent total closing of the tube.

A tube made in this manner is, however, very liable to break at the constriction, and irregularities will inevitably occur at the transition between the lumen of the pipette and the constriction.

The object of the present invention is to manufacture constriction-type pipettes without any appreciable weakening at the constriction and having a well defined constriction. The two qualities or features are essential in constriction-type pipettes so as to ensure partly substantial durability, partly safe use and partly a low percentage of waste in manufacture.

In the method according to the invention a hair-thin wire element is mounted axially in the pipette tube, after which the pipette tube is mounted between the deforming means which are then passed radially towards same and pressed into close contact with the wire element so as to form between them a circle of radial stiffening ribs forming angles with each other that very substantially from 180°.

The wire element ensures a well defined capillary passage, regardless of the force at which the jaws are pressed against the material, and since there is thus no risk of closing the passage, the jaws may be allowed to press out excessive material lying between them to form the stiffening ribs which provide the pipette with a sufficient moment of resistance in all axial planes to ensure its resistance to bending fractures at the constriction.

The deforming means, which are used to carry out the method of the invention comprise pressure jaws pressed together so as only to leave so little space between them that the material opposite the constriction will be forced so far out between the jaws that each rib with a curved back is caused to protrude outside the envelope or external diameter of the pipette tube. The pressure jaws may according to the invention be closed so much that each rib takes the form of a handle that constitutes a fixed connection between the two conical transitory sections between the constriction and the non-deformed parts of the pipette tube without contacting the constriction.

If in accordance with the invention at least three angularly equidistant ribs are formed, there will be an improved possibility of ensuring that the solid angle in the lumen of the pipette becomes perfectly uniform, and the shape of the jaws may straightaway be adapted in such manner that the angle will be about 45°.

To produce a prompt solidification starting at the inner side of the deformed plastic wall, use may be made according to the invention of a wire element consisting of a substantially thermal-conductive material such as silver or copper. The thermal-conductive material rapidly transmits the heat from the place of constriction and may therefore be removed after a brief period, whereby the time used for carrying out the method is reduced without risk of deteriorating the useful qualities of the constriction pipettes produced.

The apparatus forming the pipette of the invention has pressure jaws with obliquely cut upper and lower ends to form an angle of about 45° and for forming the conical transistory sections, and has furthermore a wire of capillary thickness and of substantially thermal-conductive material for introduction into a central position between the jaws.

The drawing shows two embodiments of the constriction-type pipette according to the invention and apparatus for its manufacture.

FIGURE 1 is a side view of a pipette with ribs of butterfly-shape opposite the constriction.

FIGURE 2 is a section on the line II—II of FIGURE 1.

FIGURE 3 shows another embodiment of the pipette with handle-shaped ribs opposite the constriction, which is illustrated partly in section.

FIGURE 4 is a section on the line IV—IV of FIGURE 3.

FIGURE 5 is a partial section of a tool for the manufacture of constriction and ribs.

The constriction-type pipette shown in FIGURES 1 and 2 consists of a pipette tube 8 of translucent polyethylene with a cylindrical constriction 4 which is formed by deformation and which together with the two sections 15 that constitute the transitions between the constriction 4 and the non-deformed tube sections is stiffened by means of three ribs 5, the outwardly curved back edges of which extend outside the cylinder surface in which the parts 8 are located.

In the embodiment shown in FIGURES 3 and 4 the ribs of the pipette are formed as handles 16 connecting the sections 15 without contacting the constriction 4.

For the manufacture of the constriction of the pipette shown in FIGURES 1 and 2 use may be made of a tool (FIGURE 5) with three jaws, of which only two, however, are shown in FIGURE 5. For example, use may be made of a so-called self-centering chuck of the kind used for small lathes. Into the pipette tube 8 is introduced a bar 9 with a silver wire which is kept in position opposite the jaws 6. When a square head 7 is turned, the jaws, which in advance are heated to such a high temperature that they plasticise the pipette tube 8 when contacting it, are passed radially towards each other, drawn inwards by a spiral wheel 12 cooperating with teeth 13 provided on each jaw 6. The spiral wheel 12 is built together with a crown wheel 14 which is turned by a bevel pinion 11 mounted on the shaft of the square head 7.

The jaws are filed at their front end, or they may have special pressure shoes by which to provide the pipette tube 8 with a depression of hourglass shape and permitting excessive amounts of plastic material to be forced out to form the stiffening ribs 5, but in the central part of the tube 8 the silver wire 10 ensures the formation of a well defined capillary passage. Since the jaws 6 above and below the said passage have filed oblique surfaces forming an angle of about 45°, not only the outer wall of the pipette tube, but also the inner wall of the said tube will join the constricted section uniformly as a section of hourglass shape.

The whole operation lasts only a moment, since the square head 7, after being turned so much that the jaws get into their innermost position where they ensure that all the material in the tube 8 gets into contact with the silver wire 10, is turned back into the position indicated in FIGURE 1, after which the bar with the silver wire is at once withdrawn from the tube 8.

Both the thickness and the radial extent of the ribs 5 depend on the shape of the jaws 6 and the wall thickness of the tube 8.

The constriction-type pipette according to FIGURES 1 and 2 will have almost the same moment of resistance at every point and in every axial plane.

The jaws may, by the way, be so adapted that they contact each other in their inmost position. The ribs 5 will thereby partake of the character of handles 16 (FIGURES 3 and 4), and use may, for example, be made of tools with several jaws or dies, whereby the number of ribs 5 is increased correspondingly.

What I claim and desire to secure by Letters Patent is:

1. A method of manufacturing constriction-type pipettes of translucent plastic comprising, providing a tube of translucent plastic, simultaneously applying heat to an axial region of said tube intermediate other axial regions while applying radially inwardly applied pressure to said region effecting a constriction defining in the tube and a precision bore controllably flowing plastic in said region in an outwardly direction from said region in a configuration forming radial ribs along said region thereby to maintain said region in which said constriction is disposed substantally with the same strength as that of said other axial regions disposed on either side of the first-mentioned axial region including supporting said tube internally while simultaneously applying said heat and said pressure to limit and define said constriction and simultaneously removing heat from the inner surfaces in said region of said tube of plastic to set the plastic of said surfaces and precisely form said precision bore by avoiding spring-back of the plastic defining said precision bore.

2. A method of manufacturing constriction-type pipettes of translucent plastic according to claim 1, including flowing said plastic to form said ribs continuous in axial outermost zones thereof and each having a discontinuity in a zone adjacent said constriction disposed inwardly of respective ones of said outermost zones.

3. A method of manufacturing constriction-type pipettes of translucent plastic according to claim 1 in which said pressure is applied at circumferentially spaced areas in said region.

4. A method of manufacturing constriction-type pipettes of translucent plastic material according to claim 1, including removing heat from internally of said first-mentioned axial region of said tube while simultaneously applying heat externally thereof and while simultaneously applying said pressure.

5. A method of manufacturing a constriction-type pipette from a translucent plastic tube comprising, providing a tube of translucent resin material from which a constriction-type pipette is to be manufactured, inserting a heat-conductive wire axially into said tube having a cross section dimensioned to correspond to internal dimensions of a constriction defining a precision bore to be formed in said tube along an axial region of said tube intermediate other axial regions next adjacent thereto in a single operation subjecting circumferentially spaced areas of said axial region to radially inwardly applied pressure while simultaneously heating said region to controllably form a neck in said region having an inner bore comprising said precision bore, simultaneously cooling with said wire surfaces of said neck defining said precision bore to maintain precise dimensions of said precision bore, and causing plastic to flow intermediate said areas outwardly from said tube forming circumferentially spaced axial ribs on said axial region thereby to maintain substantially the same strength in all of said regions.

6. A method of manufacturing a constriction-type pipette made of resin comprising, providing a tube made of resin simultaneously applying heat to an axial region of said tube intermediate other axial regions while applying radially inwardly applied pressure to said region effecting a constriction defining in the tube a precision bore and controllably flowing plastic in said region in an outwardly direction from said region in a configuration forming radial ribs along said region thereby to maintain said region in which said constriction is disposed substantially with the same strength as that of said other axial regions disposed on either side of the first-mentioned axial region, and simultaneously removing heat from the inner surfaces in said region of said tube of resin to set the resin of said surfaces and precisely form said precision bore by avoiding spring-back of the resin defining said precision bore.

References Cited

UNITED STATES PATENTS

| | | | |
|---|---|---|---|
| 3,091,105 | 5/1963 | Morill | 65—271 |
| 3,150,213 | 10/1964 | Doering | 264—40 |
| 2,972,781 | 2/1961 | Levy | 264—320 |
| 1,583,464 | 4/1926 | Housekeeper | 65—108 |
| 1,896,599 | 2/1933 | Spencer | 65—108 |
| 2,338,524 | 1/1944 | McCabe | 264—263 |
| 2,507,300 | 5/1950 | Everett | 65—108 |
| 2,997,411 | 8/1961 | Wooley | 154—2.23 |
| 3,254,147 | 5/1966 | Nakada | 264—296 |
| 2,974,367 | 3/1961 | Doering | 18—19 |

FOREIGN PATENTS

| | | |
|---|---|---|
| 3,814,830 | 1963 | Japan. |

ROBERT F. WHITE, *Primary Examiner.*

R. KUCIA, *Assistant Examiner.*

U.S. Cl. X.R.

18—19; 65—108; 264—296; 237